United States Patent
Piga et al.

(10) Patent No.: US 9,639,140 B2
(45) Date of Patent: May 2, 2017

(54) POWER MANAGEMENT OF INTERACTIVE WORKLOADS DRIVEN BY DIRECT AND INDIRECT USER FEEDBACK

(71) Applicant: Advanced Micro Devices, Inc., Sunnyvale, CA (US)

(72) Inventors: Leonardo de Paula Rosa Piga, Austin, TX (US); Mauricio Breternitz, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 47 days.

(21) Appl. No.: 14/857,788

(22) Filed: Sep. 17, 2015

(65) Prior Publication Data
US 2017/0083074 A1    Mar. 23, 2017

(51) Int. Cl.
*G06F 1/26* (2006.01)
*G06F 1/32* (2006.01)

(52) U.S. Cl.
CPC ........... *G06F 1/3228* (2013.01); *G06F 1/329* (2013.01)

(58) Field of Classification Search
None
See application file for complete search history.

(56) References Cited

U.S. PATENT DOCUMENTS

| | | | |
|---|---|---|---|
| 7,913,071 B2* | 3/2011 | Mallik | G06F 1/3203 455/127.5 |
| 8,689,220 B2* | 4/2014 | Prabhakar | G06F 9/4893 703/13 |
| 2006/0123252 A1* | 6/2006 | Vaidya | G06F 1/3228 713/300 |
| 2011/0131335 A1* | 6/2011 | Spaltro | G06F 9/5072 709/228 |

OTHER PUBLICATIONS

Yan, Le, Lin Zhong, and Niraj K. Jha. "User-perceived latency driven voltage scaling for interactive applications." Proceedings of the 42nd annual Design Automation Conference. ACM, 2005.

* cited by examiner

*Primary Examiner* — Nitin Patel
(74) *Attorney, Agent, or Firm* — Liang & Cheng, PC

(57) ABSTRACT

A method of managing power state transitions for an interactive workload includes storing one or more parameters, each representing an electrical operating characteristic that controls power consumption of the processing unit, receiving a first user input requesting execution of a task by the processing unit, in response to receiving a second user input, modifying at least one of the one or more parameters, and executing the task in the processing unit while operating the processing unit according to the at least one modified parameter.

20 Claims, 3 Drawing Sheets

POWER MANAGEMENT OF INTERACTIVE WORKLOADS DRIVEN BY DIRECT AND INDIRECT USER FEEDBACK

TECHNICAL FIELD

This disclosure relates to the field of power management and, in particular, to power management in a computing system.

BACKGROUND

Many modern computing systems include power management functionality for reducing the overall amount of power consumed by the computing system. Power management may be implemented using software or hardware in the computing system capable of placing the computing system in different power states. For example, a power management scheme may cause the computing system to operate in the power state having the lowest power demand to conserve energy.

When executing a workload, a computing system may characterize the workload beforehand and adjust the system to effect a desired average response time. Other solutions may adjust the system based on ancillary metrics such as central processing unit (CPU) utilization, or end-to-end response; however, such metrics still may not accurately reflect a user's satisfaction with the response time.

In some computing platforms, users may be charged based on utilization time. This approach encourages users to prioritize performance when scheduling a job, since a faster completion time results in a lower cost to the user. However, users should have incentives for accepting a longer completion time in exchange for reduced power consumption.

BRIEF DESCRIPTION OF THE DRAWINGS

The present disclosure is illustrated by way of example, and not by way of limitation, in the figures of the accompanying drawings.

DETAILED DESCRIPTION

Figure 1:
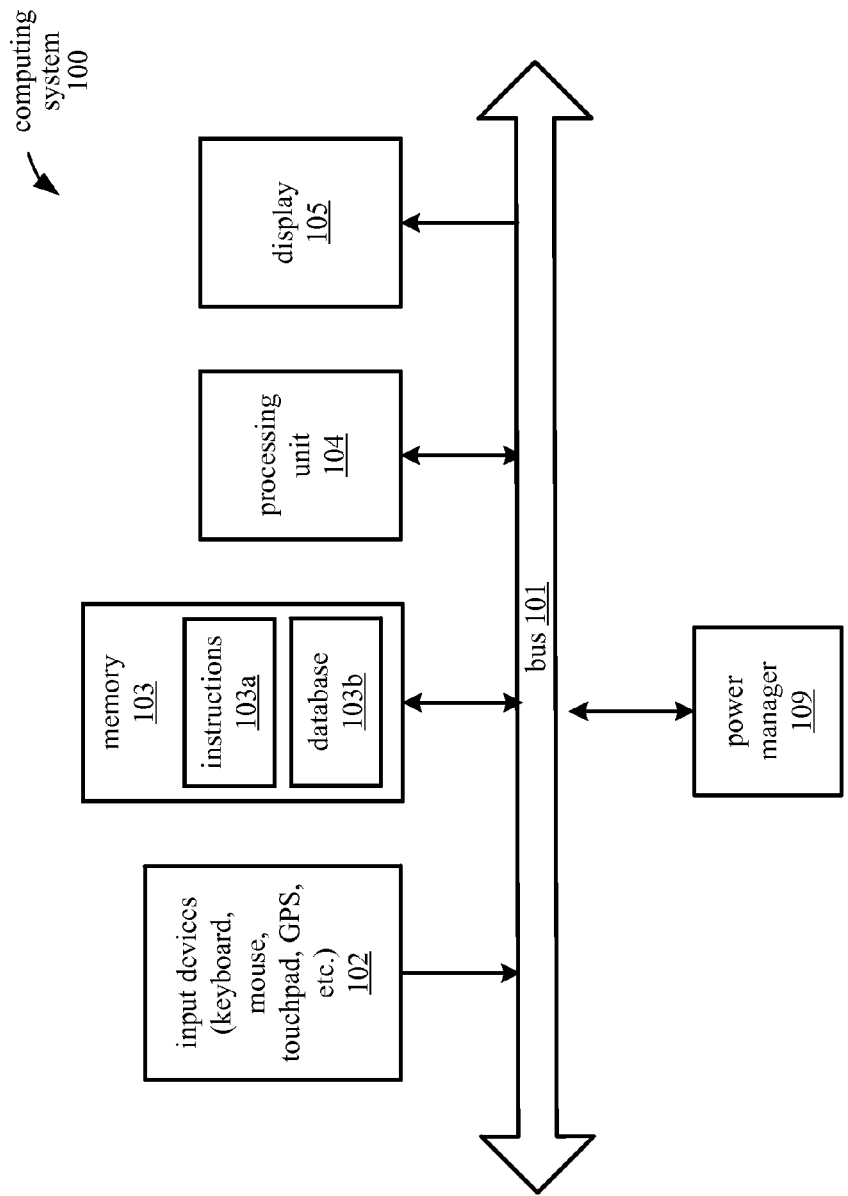
FIG. 1 illustrates a computing system according to an embodiment.

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the spirit and scope of the embodiments.

In one embodiment, a computing system implements a power management scheme that changes the power state of the computing system for execution of a task based on user inputs received during or prior to execution of the task. To execute a task, the user submits an input to the computing system requesting execution of the task. While the task is being executed, the user may submit additional inputs that cause the computing system to increase or decrease the power consumption for executing the task. In one embodiment, the computing system responds to the additional user inputs by switching the power state for executing the task. In one embodiment, the computing system is configured to switch the power state of processes that are related to the task, while leaving the power state of unrelated processes unchanged.

The additional inputs provided by the user are inputs that indicate the user's satisfaction with the response time for the task being executed; thus, this approach allows the computing system to dynamically balance power consumption and performance according to the user's satisfaction, which can be explicitly indicated or can be inferred based on the user's interaction with the system. The computing system is further configured to store the modified power state that is associated with the task in memory so that modified power state can be used for execution of the same task in the future.

In one embodiment, the stored power state defines one or more parameters for operating the computing system. These parameters may represent electrical operating characteristics for the computing system or for a processing unit in the computing system. For example, one type of processing unit that can be used in the computing system is a processor that is capable of operating at multiple voltage supply levels and multiple clock frequencies. Thus, each power state in such a computing system is associated with a particular combination of a voltage supply level and a clock frequency for the processor. In one embodiment, this technique for managing power consumption may be implemented in mobile devices (e.g., phones, tablets, laptops, etc.) which dynamically manage energy consumption while interacting with the user, as well as in the field of interactive analytics (which could perform data mining, or tasks such as speech recognition) to address and respond to user input.

In an embodiment of a computing system on which users can purchase computing time to perform requested tasks (e.g., a computer cluster), an initial user input requests execution of the task, then the computing system modifies the power state for executing the task based on a subsequent user input. Instead of merely estimating the completion time and cost for the task based on the maximum performance of the computing system or based on a performance level indicated by the user, the computing system may estimate completion times for execution of the task using one or more lower power consumption states. The computing system may then present these options to the user to allow the user to accept executing the task using a lower level of power consumption, resulting in a longer completion time for the task but decreased cost to the user. This approach incentivizes users to consider the power constraints of the computing system, when such users might otherwise overestimate their performance requirements or prioritize performance over power consumption.

FIG. 1 illustrates an embodiment of a computing system 100 which may implement a power management scheme that changes the power state of the computing system 100 based on user inputs as described above. In general, the computing system 100 may be embodied as any of a number of different types of devices, including but not limited to mobile phone, personal computer, data center server, cluster computer, etc. The computing system 100 includes a number of components 102-109 that can communicate with each other through a bus 101. In computing system 100, each of the components 102-109 is capable of communicating with any of the other components 102-109 either directly through the bus 101, or indirectly through one or more of the other components 102-109. The components 101-109 in computing system 100 are contained within a single physical casing, such as a laptop or desktop chassis, or a mobile phone casing. In alternative embodiments, some of the components of computing system 100 may be embodied as peripheral devices such that the entire computing system 100 does not reside within a single physical casing.

Computing system 100 includes a processing unit 104 that is capable of executing instructions of a task. In one embodiment, the processing unit 104 is a processor; alternatively, the processing unit may be implemented as some other device, such as a field-programmable gate array (FPGA), programmable logic device (PLD), etc. The processing unit 104 is coupled via bus 101 to a memory subsystem 103. The memory subsystem 103 includes memory devices used by the computing system 100, such as random-access memory (RAM) modules, read-only memory (ROM) modules, hard disks, and other non-transitory computer-readable media.

The memory subsystem 103 stores instructions 103*a* in a location that can be accessed by the processing unit 104, such that the processing unit 104 can retrieve and execute the instructions 103*a*. The instructions 103*a* define one or more tasks; for example, tasks for which execution is requested by a user are stored as instructions 103*a* in memory 103. In addition to storing instructions 103*a*, the memory system 103 also stores a database 103*b*, which includes parameters for operating the processing unit 104 that affect the power consumption of the system while executing the task. These parameters may represent electrical operating characteristics of the processing unit 104, such as a frequency of a clock signal supplied to the processing unit 104 or a voltage level of a power supply used to power the processing unit 104.

In one embodiment, the database 103*b* associates each of multiple tasks with a set of parameters in the database 103*b*. For example, each task represented in the instructions 103*a* may be associated with a clock frequency and a voltage level for operating the processing unit 104 while executing the task.

The computing system 100 also includes a power manager 109, which may include hardware, software, and/or firmware for allowing the computing system 100 to operate in different power states. In one embodiment, the power manager 109 facilitates applying the operating parameters (e.g., clock frequency and power supply voltage for the processing unit 104) stored in the database 103*b*.

The computing system 100 also includes user interface devices for receiving information from or providing information to a user. Specifically, the computing system 100 includes input devices 102, which may include a keyboard, mouse, touch-screen, or other devices for receiving information from the user. The computing system 100 displays information to the user via a display 105, such as a monitor, light-emitting diode (LED) display, liquid crystal display, or other output device.

Figure 2:
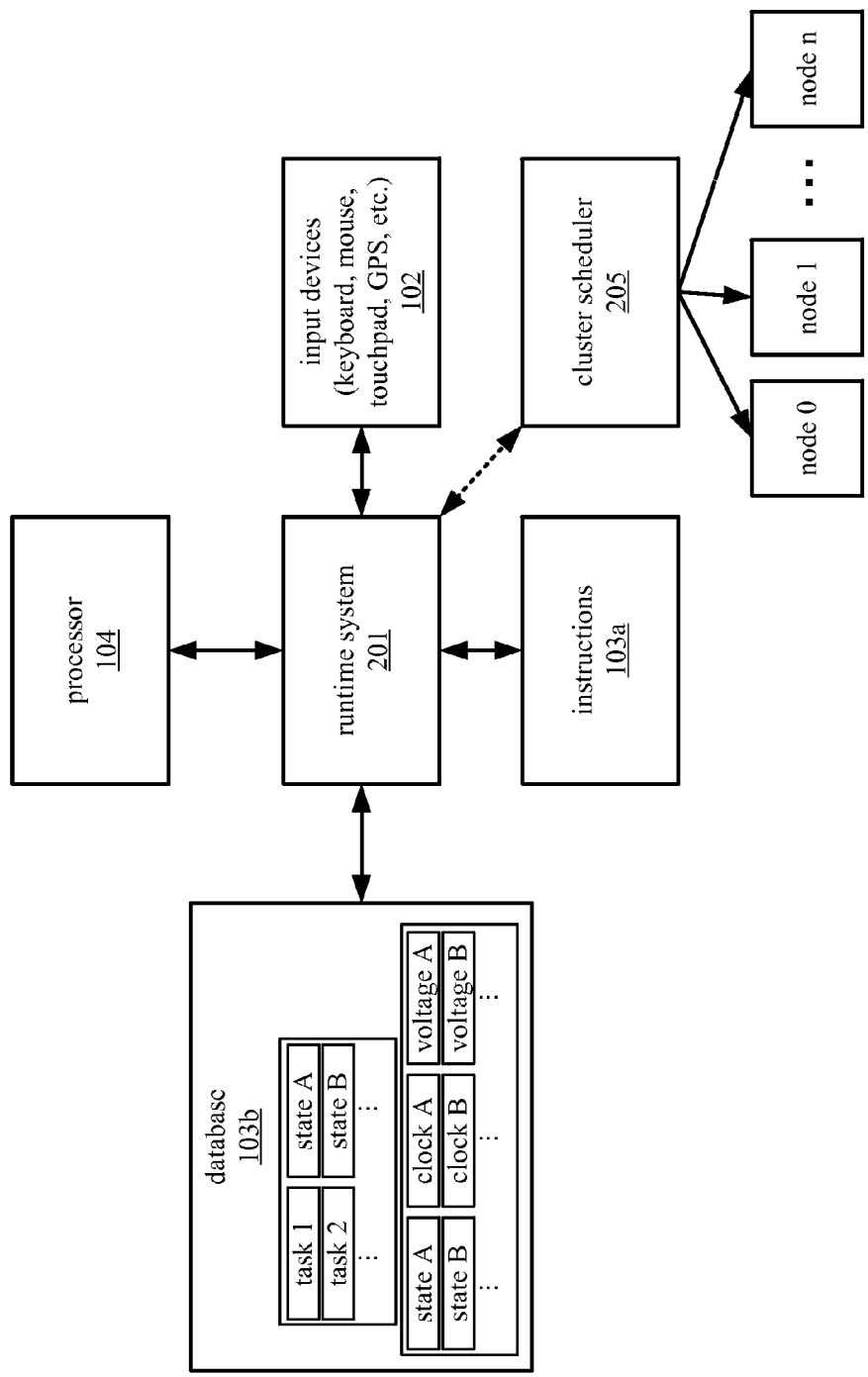
FIG. 2 is a block diagram illustrating functional components of a computing system, according to an embodiment.

FIG. 2 is a functional block diagram of components in a computing system such as computing system 100, according to an embodiment. FIG. 2 illustrates the relationships between the processor 104, database 103*b*, instructions 103*a*, input devices 102, and a runtime system 201 of the computing system 100.

The database 103*b* includes information associating each of multiple tasks (which are defined by instructions 103*a*) with a power state. For example, in database 103*b*, task 1 and task 2 are associated with power state A and power state B, respectively. The database 103*b* further stores information defining each of the power states. Each of the power states is associated with a set of operating parameters that are compatible with each other. The operating parameters include electrical operating characteristics of the processor 104, such as clock frequencies and voltage supply levels. For example, the database 103*b* associates power state A with a clock frequency 'clock A' and a voltage supply level 'voltage A', and associates power state B with a clock frequency 'clock B' and a voltage supply level 'voltage B'. The database 103*b* may also include for each power state other operating characteristics that affect power consumption. For example, the database 103*b* may indicate for each state whether certain performance features of the processor should be enabled for performance or disabled to conserve power.

The runtime system 201 includes hardware and software resources that facilitate execution by the processor 104 of a task defined in the instructions 103*a*. While the functionality of the runtime system 201 is illustrated in FIG. 2 as a separate individual block, the runtime system 201 may in practice be implemented in part by multiple other components of the computing system 100, such as the memory subsystem or processor.

In one embodiment, the runtime system 201 receives a user input via an input device 102 requesting execution in the processor 104 of a task defined in instructions 103*a* and responds by executing the task in the processor 104. In one embodiment, the runtime system 201 may begin execution of the task in the processor 104 according to existing parameters in the database 103*b* prior to receiving any subsequent input from which the user's satisfaction with the response time can be inferred. Alternatively, the runtime system 201 may postpone execution of the task until the user has indicated by a subsequent user input a desired balance between performance and power consumption.

Accordingly, the runtime system 201 may receive the subsequent user input via input devices 102 during or prior to execution of the task. In response to this input, the runtime system 201 modifies one or more of the parameters stored in database 103*b* in order to increase or decrease power consumption for the requested task. For example, the runtime system may assign power 'state A' to 'task 1', indicating that the processor should be supplied a clock frequency 'clock A' and a supply voltage 'voltage A' when the processor 104 is executing 'task 1'.

The input devices 102 include input devices (e.g., keyboard, touchscreen, mouse, etc.) that enable a user to direct the computing system 100, as well as environmental sensors (e.g., global positioning system (GPS) locator, tilt sensors, etc.) that provide environmental information that can be used to infer a user's satisfaction with the response time of the computing system 100.

The computing system 100 determines the user's satisfaction with the response time of the task by receiving explicit input from a user indicating a desire for a faster response time or by inferring the user's satisfaction level based on one or more inputs. In one embodiment, the user may explicitly indicate a desire for increased performance by activating a user interface button or control displayed on a screen of the computing device. For example, the user may press a 'boost' button on an application's graphical user interface (GUI).

Repeated activation of such a button and a higher frequency of activation can indicate greater dissatisfaction with the response time; accordingly, the runtime system 201 may respond to the recorded button activity exceeding certain thresholds, such as the number of button presses, frequency of button presses, etc. with an increase in the performance and power consumption. The runtime system 201 may increase the power consumption of the processor 104 by modifying one or more of the parameters in the database 103b to change power states, then executing the task in the processor 104 while operating the processor 104 according to the modified parameters.

In cases where the task or application running the task generates a task window for displaying a user interface for the task or information generated by the task, the computing system 100 can also detect decreased interest or inattentiveness to the application or task when the user changes focus away from the task window. For example, the user may minimize the window or switch to the window of another application, thus indicating that the user is not actively monitoring the minimized or unfocused application or task. The computing system 100 can then respond by decreasing the power consumption on the basis that the user is otherwise occupied and is willing to tolerate a longer response time.

Many mobile devices also include a tilt or orientation sensor; in one embodiment, such a mobile device can detect a user's decreased interest in the application or task based on the orientation of the mobile device. For example, when the mobile device oriented in a position that does not facilitate viewing of the display screen, (e.g., a downward-facing position), the mobile device can infer that the user is not actively monitoring the task and can decrease the power consumption. In one embodiment, a nominal viewing angle is defined such that the power state can be changed when the measured tilt angle of the device exceeds a threshold tilt angle relative to the nominal viewing angle.

Determining the user's interest level in the task may also be informed by one or more environmental factors, such as the physical speed and location and location of the device, or the network connection characteristics of the device. For example, for a mobile device including a GPS locator that indicates movement of the device in excess of a threshold speed, the mobile device can utilize increased power consumption and performance for certain relevant applications, such as a mapping application or location-based services. Accordingly, the mobile device can decrease performance and power consumption for such applications when the mobile device is not exceeding the threshold speed. A low-bandwidth network connection may cause the mobile device to increase its processor's clock frequency in order to compress or decompress data more quickly and achieve a faster response time for the user.

In one embodiment, the computing device is part of a computer cluster on which users can purchase computing time for executing tasks; in such an embodiment, the computing device is connected to a cluster scheduler 205 which is capable of scheduling tasks to be executed on one or more nodes 0-n, which represent cluster computers. Thus, each of the nodes may include similar components as the computing device 101.

In the cluster environment, the runtime system 201 can provide cost estimations to the user in order to solicit user input for setting the power state for the nodes in the cluster. In one embodiment, the user requests the execution of a task by the cluster, and specifies the desired performance demands for executing the task. In response to the request, the runtime system 201 provides a cost estimation based on power constraints of the cluster. The runtime system 201 calculates an estimated completion time and a cost based on power consumption for executing the task using each of one or more reduced power consumption states, then provides to the user a list of the power consumption costs for executing the task using the different power states. If the user accepts one of these proposed costs, then the user can provide input indicating a selection of the corresponding reduced power consumption state for executing the task.

The runtime system 201 begins execution of the task in response to the selection by invoking the cluster scheduler 205 to schedule the task for execution in one or more of the nodes 0-n. The power states for the nodes are set based on the user input. In one embodiment, changing the power state for a given node entails adjusting the clock frequency or power supply voltage for a processing unit of the node. Power consumed by each node while executing the task is tracked, and the user is charged based on the total amount of power used by the nodes for executing the user's task.

Figure 3:
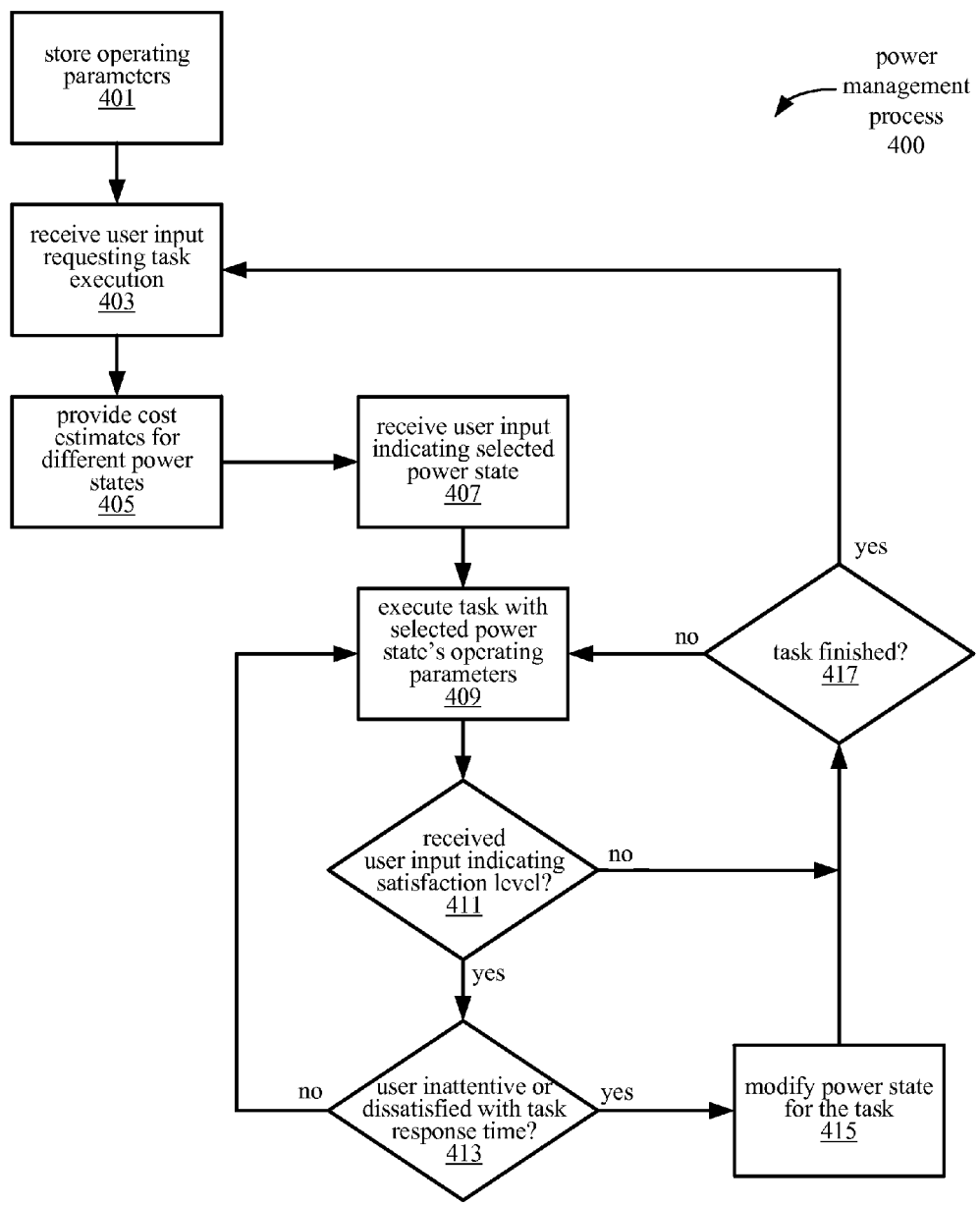
FIG. 3 is a flow diagram illustrating a power management process, according to an embodiment.

FIG. 3 is a flow diagram illustrating a power management process 400 for an interactive workload that responds to user input and that can be implemented in a computing device 100, according to an embodiment. Interactive workloads are generally characterized by a cycle of receiving user input, processing, and issuing a response. The power management process 400 begins at block 401.

At block 401, the computing device 100 maintains a set of operating parameters in a database 103b. The operating parameters represent electrical operating characteristics of the processing unit 104, such as a clock frequency or a voltage supply level applied to the processing unit 104. In general, the parameters represent values that control the power consumption of the processing unit 104, components within the computing system 100, or of the computing system 100 as a whole. From block 401, the process 400 continues at block 403.

At block 403, the computing device 100 receives user input requesting the execution of a task by the processing unit 104 or by another processing unit (e.g., a processing unit in a connected cluster computer). The user input is received via the input devices 102 of the computing device 100, or may be received by another mechanism such as a network connection. In requesting execution of the task, the user may also specify a performance demand for the task; for example, the user may specify that the task should be completed within a certain amount of time. From block 403, the process 400 continues at block 405.

The computing device 100 at block 405 determines a cost estimate for executing the task using each of multiple alternative power states. In one embodiment where the computing device 100 is connected to a computer cluster, the cost estimates are for execution of the task in the cluster and are calculated by the cluster scheduler 205 based on the power and performance characteristics of the cluster nodes 0-n. The computing device provides a list of the calculated cost estimates to the user on a screen or other output device, and allows the user to select an alternative power state for executing the task at the corresponding cost. From block 405, the process 400 continues at block 407.

At block 407, the computing device 100 receives a user input indicating a selected power state for executing the task. The user input may alternatively indicate that the user is unwilling to accept reduced performance and power consumption for the task; in this case, task scheduling can proceed with the performance demand as specified by the user at block 403, or with a default power state for the task stored in database 203b. If the user accepts decreased performance (i.e., a longer completion time) and reduced power consumption in exchange for a lower cost by selecting one of the provided options, the task scheduling can proceed with the selected power state. From block 407, the process 400 continues at block 409.

At block 409, the computing device 100 executes the task in the processing unit 104 using the operating parameters associated with the selected power state. If needed, the power manager 109 may change the operating characteristics of the processing unit 104. For example, the power manager 109 may change the clock frequency and/or supply voltage to the processing unit 104 prior to starting execution of the task. For embodiments where the task is to be executed in one or more computer cluster nodes (e.g., nodes 0-$n$), the power states may similarly be changed for each of the nodes in which the task is executed. The computing device thus executes the task in the processing unit 104 or in processing units of multiple cluster nodes while operating the processing unit(s) according to the parameters associated with the power state corresponding to the task. From block 409, the process 400 continues at block 411.

At block 411, the computing device 100 receives a user input that indicates the user's satisfaction with the response time of the task being executed. The user input is received as a direct input by the user from one of the input devices 102, or from sensing of environmental conditions such as location, orientation, network connectivity, etc. For example, minimizing a task window displaying information generated by the task or otherwise changing the focus away from the task window, changing the orientation of the computing device so that a tilt signal indicating that a tilt angle of the display unit 105 exceeds a threshold tilt angle away from a nominal viewing angle, or other actions suggesting that the user is inattentive to the task may indicate that the user is willing to tolerate a longer response time resulting from decreased performance and reduced power consumption. Alternatively, changing focus to the task window or repeated interactions with the user interface (e.g., repeated activation of a 'boost' button) may indicate the user's dissatisfaction with the response time of the task.

At block 411, if a user input is not received, the process 400 continues at block 417. From block 417, the process 400 continues executing the task at block 409 if the task has not finished; otherwise, if the task has finished, the process 400 continues to block 403 to receive a user request for executing the next task. At block 411, if a user input is received that can be used to determine the user's satisfaction level, the process 400 continues at block 413.

At block 413, the computing system 100 determines based on the user input whether or not the user is satisfied with the response time of the task. If the user input indicates that the user is attentive to the task and is satisfied with the response time of the task, the process 400 continues back to block 409 to continue executing the task using the current power state and performance level. Otherwise, if the user input indicates the user is inattentive or is dissatisfied with the response time, then the process 400 continues at block 415.

At block 415, the runtime system 201 modifies the power state of the processing unit used to execute the task. For example, when the task is being executed by processing unit 104, the runtime system 201 may modify an entry for the task in the database 203$b$ that indicates the power state that is associated with the task, causing the power manager 109 to change the power state of the processing unit 104. The runtime system 201 thus changes the parameters associated with the task, which may include a voltage level parameter indicating a voltage level supplied to the processing unit 104 and a frequency level parameter indicating a frequency of a clock signal supplied to the processing unit 104.

When the user input indicates that the user may be dissatisfied with the task response time, the runtime system 201 increases the power consumption in order to increase performance and decrease response time. The increase in power consumption may correspond to an increase in the clock frequency and/or the voltage level supplied to the processing unit 104. However, if the user input indicates that the user is not paying attention to the task, the runtime system 201 decreases the power consumption of the processing unit 104 by decreasing one or both of the clock frequency and the voltage level supplied to the processing unit 104. From block 415, the process 400 continues at block 417. At block 417, if the task is not completed, then the process 400 continues back to block 409 to continue executing the task in the processing unit 104 while operating the processing unit 104 according to the modified parameters associated with the new power state.

The process 400 thus repeats the operations of blocks 409, 411, 413, 415, and 417 in order to dynamically monitor the user's satisfaction level with the response time of the task while the task is being executed, and change the power consumption of the processing unit executing the task accordingly. At block 417, when the task is completed, the process 400 continues back to block 403 to receive a user request to execute the next task.

Embodiments of the power management process 400 may be implemented in various types of computing systems, such as mobile devices, personal computers, computer clusters, datacenter servers, etc. In some embodiments, blocks illustrated in FIG. 3 as part of process 400 may be performed in different orders or may be omitted as optional. For example, for some embodiments implemented in a mobile device or personal computer, the process 400 may omit blocks 405 and 407 and proceed from block 403 to block 409. Similarly, some embodiments of process 400 implemented in a computer cluster or datacenter server may omit blocks 411, 413, and 415, proceeding from block 409 to block 417.

The embodiments described herein may include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The non-transitory computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the computing system 100 and/or portions thereof carried on the computer-readable storage medium may be a database or other data structure which can be read by a program and used, directly or indirectly, to fabricate the hardware comprising the computing system 100. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the computing system 100. The netlist may then be placed and routed to produce a data set describing geometric shapes to be applied to masks. The masks may then be used in various semiconductor fabrication steps to produce a semiconductor circuit or circuits corresponding to the computing system 100. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the broader spirit and scope of the embodiments as set forth in the appended claims. The specification and drawings are, accordingly, to be regarded in an illustrative sense rather than a restrictive sense.

What is claimed is:

1. A method, comprising
storing one or more parameters, wherein each of the one or more parameters represents an electrical operating characteristic of a processing unit that controls power consumption of the processing unit;
receiving a first user input requesting execution of a task by the processing unit;
in response to receiving a second user input, modifying at least one of the one or more parameters; and
executing the task in the processing unit while operating the processing unit according to the at least one modified parameter.

2. The method of claim 1, further comprising, in response to receiving the first user input, executing the task in the processing unit prior to receiving the second user input while operating the processing unit according to the one or more parameters.

3. The method of claim 1, further comprising providing a list of power consumption costs to a user, wherein the second user input indicates a power consumption cost selected from the list of power consumption costs.

4. The method of claim 1, wherein executing the task while operating the processing unit according to the at least one modified parameter increases the power consumption of the processing unit.

5. The method of claim 1, wherein the one or more parameters further comprises a voltage level parameter indicating a voltage level supplied to the processing unit and a frequency level parameter indicating a frequency of a clock signal supplied to the processing unit.

6. The method of claim 1, wherein the second user input comprises minimizing a task window displaying information generated by the task.

7. The method of claim 1, wherein the second user input comprises a tilt signal indicating that a tilt angle of a display unit coupled with the processing unit exceeds a threshold tilt angle.

8. An apparatus, comprising:
a processing unit;
a database coupled with the processing unit and configured to store one or more parameters, wherein each of the one or more parameters represents an electrical operating characteristic of the processing unit and controls power consumption of the processing unit; and
a runtime system configured to:
in response to receiving a first user input, execute the task in the processing unit, and
in response to receiving a second user input, modify at least one of the one or more parameters for the execution of the task in the processing unit.

9. The apparatus of claim 8, wherein the runtime system is further configured to, in response to receiving the first user input, executing the task in the processing unit prior to receiving the second user input while operating the processing unit according to the one or more parameters.

10. The apparatus of claim 8, wherein the runtime system is further configured to provide a list of power consumption costs to a user, and wherein the second user input indicates a power consumption cost selected from the list of power consumption costs.

11. The apparatus of claim 8, wherein the one or more parameters further comprises a voltage level parameter indicating a voltage level supplied to the processing unit and a frequency level parameter indicating a frequency of a clock signal supplied to the processing unit.

12. The apparatus of claim 8, wherein the second user input comprises minimizing a task window displaying information generated by the task.

13. The apparatus of claim 8, wherein the runtime system is further configured to increase the power consumption of the processing unit by executing the task while operating the processing unit according to the at least one modified parameter.

14. The apparatus of claim 8, wherein the apparatus is a mobile device, and wherein the second user input indicates that a tilt angle of the mobile device exceeds a threshold tilt angle.

15. A non-transitory computer readable medium storing instructions that when executed by a processor cause the processor to perform a method comprising:
storing one or more parameters, wherein each of the one or more parameters represents an electrical operating characteristic of a processor that controls power consumption of the processor;
receiving a first user input requesting execution of a task by the processor;
in response to receiving a second user input, modifying at least one of the one or more parameters; and executing the task in the processor while operating the processor according to the at least one modified parameter.

16. The non-transitory computer readable medium of claim 15, wherein the method further comprises, in response to receiving the first user input, executing the task in the processor prior to receiving the second user input while operating the processor according to the one or more parameters.

17. The non-transitory computer readable medium of claim 15, wherein the method further comprises providing a list of power consumption costs to a user, wherein the second user input indicates a power consumption cost selected from the list of power consumption costs.

18. The non-transitory computer readable medium of claim 15, wherein the method further comprises a voltage level parameter indicating a voltage level supplied to the processor and a frequency level parameter indicating a frequency of a clock signal supplied to the processor, and wherein executing the task while operating the processor according to the at least one modified parameter increases the power consumption of the processor.

19. The non-transitory computer readable medium of claim 15, wherein the second user input comprises minimizing a task window displaying information generated by the task.

20. The non-transitory computer readable medium of claim 15, wherein the second user input comprises a tilt signal indicating that a tilt angle of a display unit coupled with the processor differs from a target angle by more than a threshold angle.

* * * * *